E. THOMPSON.
Gas Condenser.
No. 103,392.  Patented May 24, 1870.
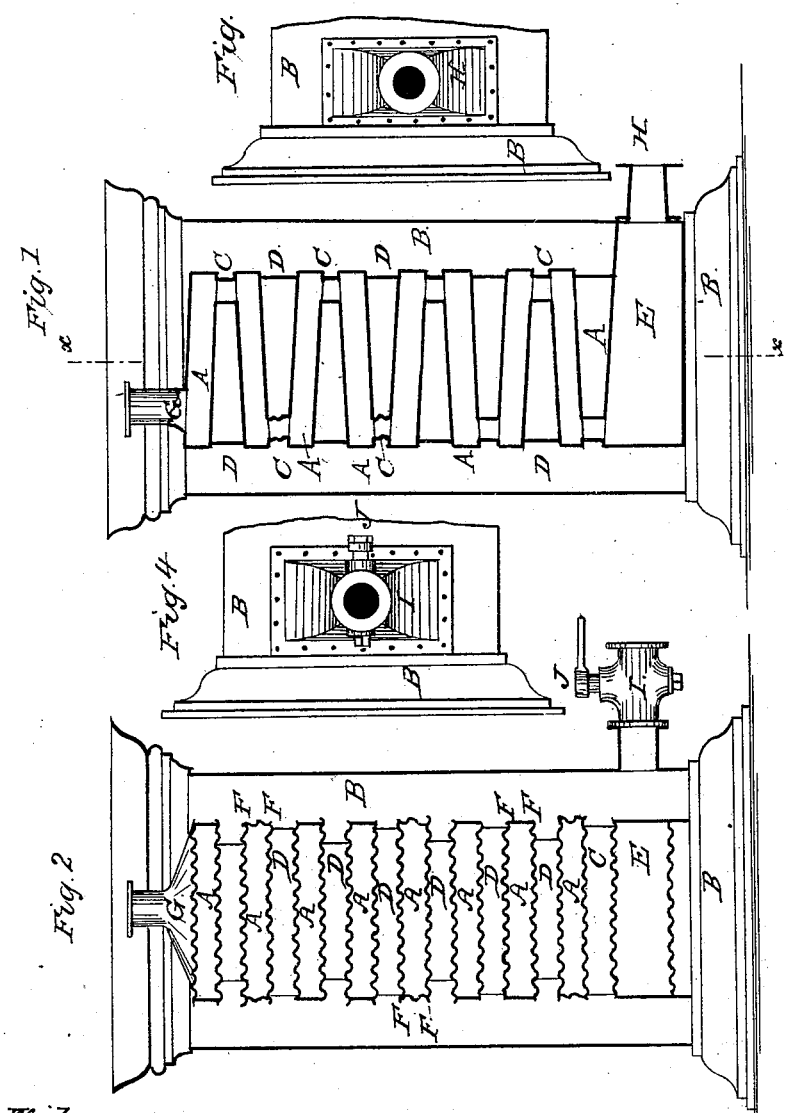

UNITED STATES PATENT OFFICE.

EDWARD THOMPSON, OF MADISON, WISCONSIN.

IMPROVED GAS-CONDENSER.

Specification forming part of Letters Patent No. 103,392, dated May 24, 1870; antedated May 14, 1870.

*To all whom it may concern:*

Be it known that I, EDWARD THOMPSON, of Madison, in the county of Dane and State of Wisconsin, have invented a new and useful Gas-Condenser; and I do hereby declare the following to be a full, clear, and exact description thereof, which will enable others skilled in the art to which my invention appertains to make and use the same, reference being had to the accompanying drawings, forming part of this specification, in which—

Figure 1 is a side elevation of my improved condenser, partly in section, and with one side of the tank removed. Fig. 2 is a transverse vertical section of the same through the line *x x*, Fig. 1; and Figs. 3 and 4 are detail views, to be hereinafter referred to.

Similar letters of reference indicate corresponding parts in the several figures of the drawings.

My invention relates to gas-condensers employed for reducing the temperature of illuminating-gas before it enters the lime-purifier. When illuminating-gas enters the condenser it contains a large proportion of tarry and ammoniacal vapor, which must be abstracted before leaving the condenser. Otherwise the tar would pollute the lime in the purifier and interfere with its purification. On this account the gas must be cooled as much as possible before entering the purifier in order to condense these vapors and to favor the action of the lime upon sulphureted hydrogen, which is more energetic the lower the temperature of the gas. Moreover, the decrease of temperature frees the ammoniacal vapors, and consequently permits a more thorough action of the lime upon the sulphureted hydrogen.

My invention has for its object to so construct a condenser that it shall more effectually cool the gas before it enters the purifier.

To this end it consists, first, in purifying coal-gas by passing the same through a series of horizontal or vertical tubes or chambers composed of corrugated metal, and surrounded by water or a current of cold air.

It consists, secondly, in constructing the tubes or chambers wholly or in part of corrugated metal plates, whereby the same are strengthened and an increased cooling surface formed for the gas.

It consists, thirdly, in the combination, with the tubes or chambers composed wholly or in part of corrugated metal plates, of the short tubes by which communication is formed between the chambers, constructed in such a manner that the gas shall pass from one chamber to another in a broad sheet.

It consists, lastly, in the arrangement of parts, and in the construction of the supply and discharge tubes, as will be hereinafter more fully described.

In the accompanying drawings, A is a series of chambers, flattened tubes, or boxes arranged one above the other within a suitable tank, B. The chambers are inclined in opposite directions, and connected together at opposite sides of the series by short tubes C, and supported upon each other by the metallic strips D. The whole series is supported upon a chamber, E, which may be enlarged, as shown in the drawings, or of the same size as the chambers A. The chambers A are constructed of corrugated-metal top and bottom plates, F and F', (shown in Fig. 1,) whereby increased surface is produced for the contact of the gas and additional strength obtained. If desired, the sides of the chambers and the short tubes C may be made of corrugated metal or corrugated and plain surfaces combined. It will be observed that these latter tubes are of a length nearly equal to the width of the chambers A. This construction is for the purpose of allowing the gas to pass from one chamber to another in a broad sheet, or rather so that the volume of gas shall not be decreased in its passage from one chamber to another.

G is the induction-pipe for the gas, arranged upon the upper chamber of the series A. It is made flaring or diverging upon opposite sides, as shown, so that the gas shall enter the chamber in a broad sheet nearly equal to the width of the chamber.

H is the discharge-pipe for the gas. It communicates with the interior of the base-chamber E, and is also made to diverge upon opposite sides, so that the gas shall be discharged in a broad sheet, and also to form a guide or spout equal in size to the opening in the base-chamber for conducting off the tarry residuum or products of condensation from said chamber. This pipe and its construction are fully shown in Fig. 3.

The operation is as follows: The tank is first filled with water to surround the chambers A, and the gas introduced to the latter through the pipe G. It then passes, as the temperature is decreased by contact with the sides of the chambers, through the whole series, and is discharged, as previously mentioned, through the pipe H, and from thence conducted to the purifier. Instead of employing water within the tank as a cooling medium, air may be in-introduced at the base through the pipe I. (Shown in Fig. 4.) The air so introduced will pass upward within the tank in currents, from the fact that as the gas is heated when it enters the chambers A through the supply-pipe G it necessarily heats to a considerable degree the upper chamber of the series, which in its turn radiates sufficient heat to warm the air surrounding it, and thus cause an ascending current from the cool-air pipe I. This latter pipe is constructed in a manner similar to the pipes G H for the purpose of admitting the air in a broad sheet to the interior of the tank. It is also provided with a stop-cock, J, by which the water, when used, may be withdrawn from the tank.

I do not desire to confine myself to the horizontal position of the chambers. They may be arranged vertically or side by side within a tank whose greatest length is in a horizontal plane.

My improved condenser is simple in construction, easily operated, and forms a more effectual cooler for gas before the latter enters the purifier than the condensers now in use.

Having thus described my invention, what I claim as new, and desire to secure by Letters Patent, is—

1. Purifying coal-gas by passing the same through a series of horizontal or vertical tubes or chambers surrounded by cold air or water, substantially as herein shown and described, for the purpose specified.

2. The chambers or tubes A, composed wholly or in part of corrugated metallic plates or wholly of plain metal, substantially as herein shown and described, for the purpose specified.

3. The combination of the tubes or chambers A, composed of metal plates, with the tank B, substantially as herein shown and described, for the purpose specified.

4. The arrangement, with relation to each other within the tank, of the chambers A and short tubes C, substantially as herein shown and described, for the purpose specified.

5. The pipes G H I, constructed as described, with opposite diverging or flaring sides, and operating as described, for the purposes specified.

The above specification of my invention signed by me this 27th day of October, 1869.

EDWD. THOMPSON.

Witnesses:
J. BROMFIELD,
L. N. FARWELL.